US010595088B2

United States Patent
Her et al.

(10) Patent No.: US 10,595,088 B2
(45) Date of Patent: Mar. 17, 2020

(54) SYSTEMS AND METHODS FOR BOOKMARKING DURING LIVE MEDIA STREAMING

(71) Applicant: NeuLion, Inc., Plainview, NY (US)

(72) Inventors: Horngwei Michael Her, Saint James, NY (US); George Hong Zhi Hsu, Plainview, NY (US); Hailin Cai, Plainview, NY (US)

(73) Assignee: NeuLion, Inc., Plainview, NY (US)

( * ) Notice: Subject to any disclaimer, the term of this patent is extended or adjusted under 35 U.S.C. 154(b) by 123 days.

(21) Appl. No.: 15/939,194

(22) Filed: Mar. 28, 2018

(65) Prior Publication Data

US 2019/0306581 A1    Oct. 3, 2019

(51) Int. Cl.
*H04N 21/472*    (2011.01)
*H04N 21/231*    (2011.01)
*H04N 21/433*    (2011.01)
*H04N 21/4335*    (2011.01)
*H04N 21/4147*    (2011.01)
*H04N 21/431*    (2011.01)

(52) U.S. Cl.
CPC ..... *H04N 21/47217* (2013.01); *H04N 21/231* (2013.01); *H04N 21/4147* (2013.01); *H04N 21/4312* (2013.01); *H04N 21/4334* (2013.01); *H04N 21/4335* (2013.01); *H04N 21/47214* (2013.01)

(58) Field of Classification Search
CPC ............ H04N 21/231; H04N 21/4147; H04N 21/4312; H04N 21/4334; H04N 21/4335; H04N 21/47214; H04N 21/47217
See application file for complete search history.

(56) References Cited

U.S. PATENT DOCUMENTS

2005/0251835 A1    11/2005    Scott et al.
2016/0249109 A1    8/2016    Nelson

*Primary Examiner* — Rong Le
(74) *Attorney, Agent, or Firm* — KPPB LLP (57) ABSTRACT

Systems and methods for bookmarking live and archived media content in accordance with various embodiments of the invention are disclosed. In one embodiment of the invention, a system for bookmarking live media content comprises a live bookmarking server system and a playback user device. The live bookmarking server system receives at least one heartbeat message containing data indicating a playback location; identifies a last-received heartbeat message; generates a live bookmark containing data referencing a live playback location; receives archival information; generates an archival bookmark containing data referencing an archival playback location; and reports the archival bookmark. The playback user device sends a request for content; receives a manifest and the archival bookmark; requests a second portion of the plurality of media files; receives the second portion; and plays back the received second portion of the plurality of media files.

22 Claims, 4 Drawing Sheets

SYSTEMS AND METHODS FOR BOOKMARKING DURING LIVE MEDIA STREAMING

FIELD OF THE INVENTION

The present invention generally relates to adaptive streaming and more specifically relates to systems and methods for bookmarking of content during the live streaming of digital media.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

To provide a consistent means for the delivery of media content over the Internet, the International Organization for Standardization (ISO) and the International Electrotechnical Commission (IEC) have put forth the Dynamic Adaptive Streaming over HTTP (DASH) standard. The DASH standard specifies formats for the media content and the description of the content for delivery of MPEG content using HTTP. In accordance with DASH, each component of media content for a presentation is stored in one or more streams. Each of the streams is divided into segments. A Media Presentation Description (MPD) is a data structure that includes information about the segments in each of the stream and other information needed to present the media content during playback. A playback device uses the MPD to obtain the components of the media content using adaptive bit rate streaming for playback.

Live streaming refers to the streaming of media that is simultaneously recorded and broadcast in real time to an audience, and may employ adaptive streaming technologies. Live streaming is often used to broadcast sporting events, news, social media events, interviews, competitions and a variety of other types of events. During the streaming of a live event, it is common for broadcasters to include commercials during selected breaks in the broadcasting of the event. These breaks may occur, for example, during a timeout of a ball game, a judging period for certain sporting events, a preparation or setup period for journalists or hosts, and/or various other types of breaks during which broadcast of the live event is undesired or not required.

SUMMARY OF THE INVENTION

Systems and methods for bookmarking of live streamed and archived media content in accordance with various embodiments of the invention are illustrated.

In one embodiment of the invention, a system for bookmarking live media content comprises a live bookmarking server system; and a playback user device. The live bookmarking server system comprises at least one processing system; and memory connected to the at least one processing system, the memory containing at least one live bookmarking application. The at least one live bookmarking application directs the at least one processing system to receive from a bookmarking user device at least one heartbeat message containing data indicating a playback location with respect to a plurality of media streams generated in real time with the capture of the content contained within the media streams; identify a last-received heartbeat message in the at least one heartbeat message; generate a live bookmark containing data referencing a live playback location with respect to the plurality of media streams based on the last-received heartbeat message; receive archival information describing a plurality of files containing archived versions of the plurality of media streams, where the archived versions of the plurality of media streams are modified to remove a first portion of the content contained within the plurality of media streams generated in real time; generate an archival bookmark containing data referencing an archival playback location with respect to the archived versions of the plurality of media streams based on the live bookmark; and report the archival bookmark to the playback user device. The playback user device comprises a processor; and processor memory connected to the processor, the processor memory containing a playback client application. The playback client application directs the processor to send a request for content; receive a manifest and the archival bookmark; request a second portion of the plurality of media files based upon the manifest and the archival bookmark; receive the second portion of the plurality of media files; and play back the received second portion of the plurality of media files.

In a further embodiment, the live bookmarking application further directs the at least one processing system to receive a plurality of heartbeat messages from the bookmarking user device, the plurality of heartbeat messages including the at least one heartbeat message; and store data from the plurality of heartbeat messages in a database.

In another embodiment, the bookmarking user device and the playback user device are the same device.

In a yet further embodiment, the live bookmark indicates a time at which playback of the content contained within the plurality of media streams was interrupted.

In yet another embodiment, the archived versions of the plurality of media streams have different durations than the plurality of media streams generated in real time.

In a still further embodiment, the removed first portion includes a commercial.

In still another embodiment, the archival information indicates differences between the plurality of media streams generated in real time and the archived versions of the plurality of media streams.

In a further additional embodiment, the live bookmarking application further directs the at least one processing system to generate the archival bookmark based on a time difference.

In another additional embodiment, the live bookmark indicates a time in the plurality of media streams corresponding to a portion of the content, and the archival bookmark indicates a time in the archived versions of the plurality of media streams corresponding to the portion of the content.

In another further embodiment, the live bookmarking application further directs the at least one processing system to report the archival bookmark to a device selected from the group consisting of a playback device and an authorization server.

In still another further embodiment, the manifest is dynamically generated based upon the archival bookmark.

A method for bookmarking live media content, according to a still yet further embodiment, comprises receiving at a server from a bookmarking user device at least one heartbeat message containing data indicating a playback location with respect to a plurality of media streams generated in real time with the capture of the content contained within the media streams; identifying by the server a last-received heartbeat message in the at least one heartbeat message; generating by the server a live bookmark containing data referencing a live playback location with respect to the plurality of media streams based on the last-received heartbeat message; receiving at the server archival information describing a plurality of files containing archived versions of the plurality of media streams, where the archived versions of the plurality of media streams are modified to remove a first portion of the content contained within the plurality of media streams generated in real time; generating at the server an archival bookmark containing data referencing an archival playback location with respect to the archived versions of the plurality of media streams based on the live bookmark; reporting the archival bookmark from the server to a playback user device; sending from the playback user device a request for content; receiving at the playback user device a manifest and the archival bookmark; requesting by the playback user device a second portion of the plurality of media files based upon the manifest and the archival bookmark; receiving at the playback user device the second portion of the plurality of media files; and playing back the received second portion of the plurality of media files using the playback user device.

In still yet another embodiment, the method further comprises receiving at the server a plurality of heartbeats from the bookmarking user device, the plurality of heartbeat messages including the at least one heartbeat message; and storing data from the plurality of heartbeat messages in a database, using the server.

In a further embodiment again, the bookmarking user device and the playback user device are the same device.

In another embodiment again, the live bookmark indicates a time at which playback of the content contained within the plurality of media streams was interrupted.

In a yet further embodiment again, the archived versions of the plurality of media streams have different durations than the plurality of media streams generated in real time.

In yet another embodiment again, the removed first portion includes a commercial.

In a still further embodiment again, the archival information indicates differences between the plurality of media streams generated in real time and the archived versions of the plurality of media streams.

In still another embodiment again, generating the archival bookmark is performed based on a time difference.

In a further additional embodiment again, the live bookmark indicates a time in the plurality of media streams corresponding to a portion of the content, and the archival bookmark indicates a time in the archived versions of the plurality of media streams corresponding to the portion of the content.

In another additional embodiment again, reporting the archival bookmark further comprises reporting the archival bookmark to a device selected from the group consisting of a playback device and an authorization server.

In another further embodiment again, the manifest is dynamically generated based upon the archival bookmark.

DETAILED DESCRIPTION

Turning now to the drawings, systems and methods for bookmarking content during live streaming of real-time events in accordance with many embodiments of the invention are illustrated. In many embodiments of the invention, content being transmitted to user playback devices is streamed live, or in real time as the transmitted event is occurring. In many embodiments, an encoder encodes or transcodes small segments of media data (e.g. audio or video) into container files and transfers the container files to a content distribution network. The system can distribute manifest files that enable the downloading of the container files that contain the media data. The manifest files can provide information enabling playback devices to generate information (e.g. URLs) that can be used to retrieve container files as they are generated. In a number of instances, the system creates and streams manifest files that contain information (e.g. URLs) that can be used to retrieve container files as they are generated. During the event transmission, it may be desirable to insert advertising or other non-event programming into certain portions of the stream during, for example, periods in which the event may not be of interest to a majority of the audience. In such live stream scenarios, these commercial break periods may not be pre-identifiable, and are thus determined in real time along with and/or based on the proceedings of the event.

In some embodiments of the invention, various types of content portions including but not limited to commercial break periods are later identified using one of various methods such as, and not by way of limitation, cuepoints or markers such as SCTE-35 signals (based on the Society of Cable Telecommunications Engineers standard for Digital Program Insertion Cueing Message for Cable) contained in the transmitted stream. In other embodiments of the invention, these portions are identified using external metadata feeds originating from another entity. Alternatively, commercial breaks or other portions of the content may be marked manually by operators watching the live transmission or replay of the stream. If a user were to interrupt playback of the requested stream, such as by inputting a pause or stop request, the point in time at which the playback was interrupted could be bookmarked. The bookmark could later be referenced to indicate a point from which playback may be resumed when, for example, the user submits a future request for continued playback of the stream. However, in many cases, the live event may be recorded real time and subsequently archived after completion of the live stream. During the archiving process, certain content including but not limited to commercials, other non-event programming, and/or portions from the live event, may be removed from the files containing the media content (or replaced with alternative materials), and/or the corresponding time durations for the break periods subtracted out (or altered), leaving an archived version that contains only event content, and with a duration corresponding to the archived event content. In such situations, the previously saved piece of data referencing a playback location within the live stream (often referred to as a bookmark) may no longer indicate the correct point during, or portion of, the event at which the user interrupted playback, in relation to the archived version of the files containing the media content. Typically bookmarks include data describing a timestamp and/or a URL indicating a container file that can be utilized to resume playback of content. In many embodiments, reencoding of content results in the archived content having a different duration and/or format than that of the live stream. Accordingly, timestamps and/or URLs generated based upon the live stream will not accurately reference a corresponding location within the archived stream.

In a number of embodiments of the invention, the bookmark saved in relation to the live stream is utilized to generate a new piece of bookmark data that points to a location within the files containing the archived media content, such that both bookmarks identify the same or a similar point in the content. Thus, if a user requests continuation of playback after the files containing the media content has been archived, this translated bookmark may allow selection of the media to retrieve and/or playback to begin at the correct point in or portion of the event where the user interrupted playback during the live stream.

As an illustrative example, an NBA basketball game has 48 minutes of regulation time, with four quarters of 12 minutes each. A typical transmission including non-regulation time, play reviews, analyses, a half-time show, and commercials can last, for example, 2 hours and 15 minutes. Supposing the live transmission includes 45 minutes of commercial time, the remaining 90 minutes of the transmission may include game-related programming and be included in the archived version of the game, with the commercials stripped out. A fan watching the game live on a mobile device may pause the transmission at minute 5 of the third quarter, occurring at for example the 90-minute mark of the live stream. A bookmark is recorded, indicating the point at which the game was paused. Several hours later, the viewer requests continued playback of the game from her television set, after which the game transmission has been archived. If this later playback were to commence at the 90-minute mark of the archived version, the program would already be over. Instead, a "translated" archival bookmark may identify the location within the files containing the archived media content at which minute 5 of the third quarter begins. Commencing playback at this location would allow the user to continue viewing the game from the point at which she previously interrupted playback.

It should be readily apparent to one having ordinary skill in the art that these are merely examples, and that various changes in timing can occur between live and archived versions of media content. Below, architectures for live streaming systems in accordance with some embodiments of the invention are discussed.

Live Streaming System Architectures

Figure 1:
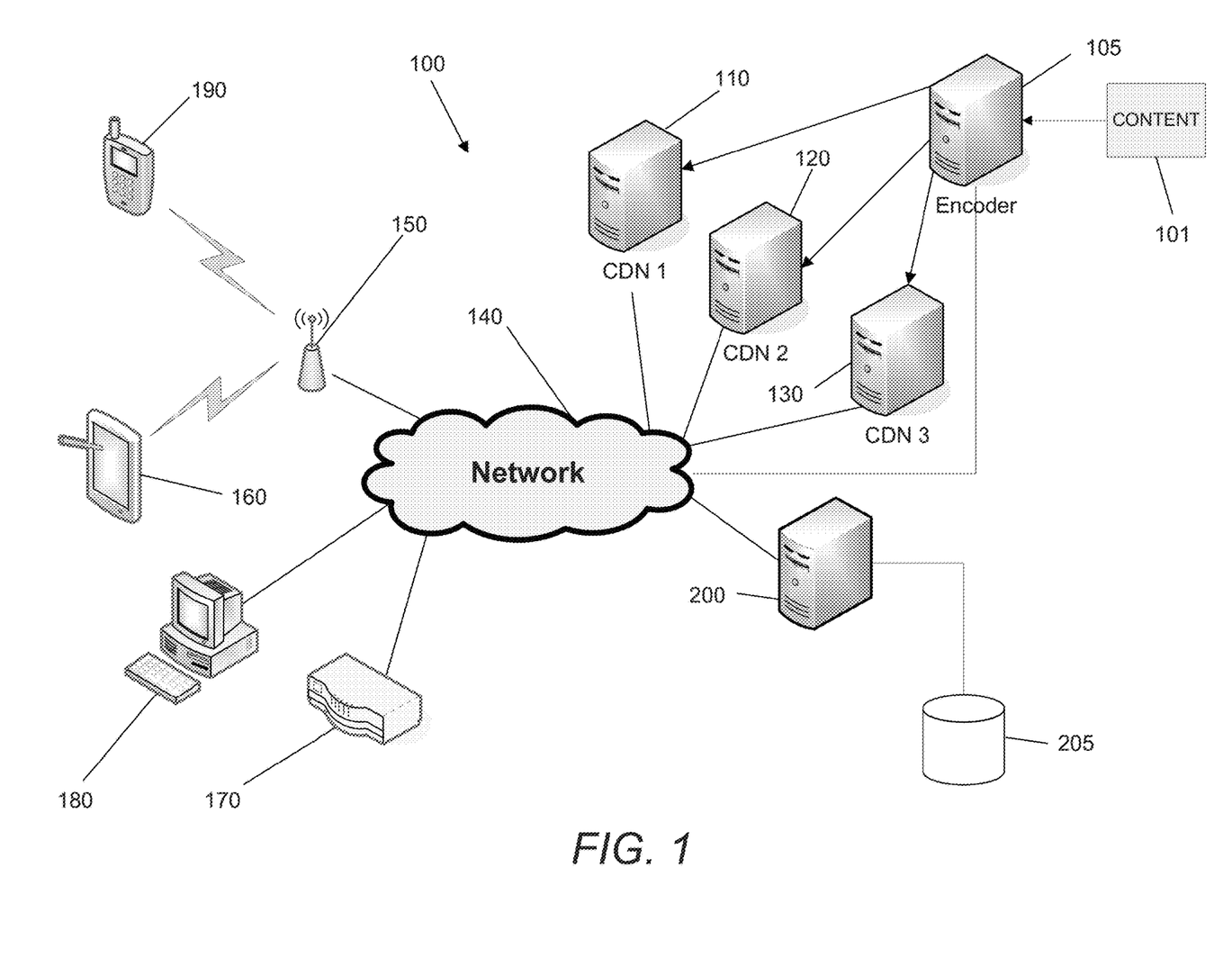
FIG. 1 is a diagram illustrating a network diagram of a live streaming system in accordance with an embodiment of the invention.

A live streaming system 100 in accordance with an embodiment of the invention is illustrated in FIG. 1. In the live streaming system 100, content 101 may be made available for streaming. The content 101 may include one or more of a variety of types of media, including but not limited to video, audio and subtitles. It may be related to one or more of a variety of subjects, including but not limited to entertainment, sports, news, and music, and may originate from one or more of a variety of content providers or sources, including but not limited to organizations and individuals.

In many embodiments of the invention, an encoder 105 processes the source content 101 into alternative streams. The source encoder 105 may include a server, or any processing device with a processor and sufficient resources to perform the encoding of source media. Alternative streams are streams that encode the same media content in different ways. In many instances, alternative streams encode media content, such as but not limited to video content and/or audio content, at different maximum bitrates. In a number of embodiments, the alternative streams of video content are encoded with different resolutions and/or at different frame rates.

In certain embodiments of the invention, the encoding of content can be performed in real time for live streaming. In such situations, short segments of content may be encoded and delivered to a content delivery network for immediate distribution. In many instances, media content may be encoded at different maximum bitrates and segmented into smaller portions. In some embodiments, the segments are stored in a single file which may be accessed through byte-range requests. In other embodiments, each content segment is stored in a separate file and can be accessed by file requests. In a number of embodiments, the content segments are conceptual and are simply blocks of content within a content stream.

In many embodiments of the invention, the encoder 105 delivers the processed content to a first CDN server 110 that is connected to a network 140. A second CDN server 120 and a third CDN server 130 may also be connected to the network 140 and receive alternative streams from the encoder 105. In a number of embodiments, the first, second, and third CDN servers are operated by different companies. In certain embodiments, the first CDN server 110 is distinct from the second 120 and third CDN servers 130 and/or may be located in a different data center. As can readily be appreciated, the specific location and distribution of the CDN servers is largely dependent upon the requirements of a given application.

Additionally, the system 100 may include one or more of a variety of playback devices that can communicate with the various CDNS via the network, including but not limited to personal computers 180, stand-alone playback devices 170, mobile phones 190, and personal computing devices 160, some of which may connect to the network 140 via a wireless access point 150. In the illustrated embodiment, the playback devices are represented by particular devices, but may also include (but are not limited to) consumer electronics, DVD players, Blu-Ray players, televisions, video-game consoles, tablets, and other devices that are capable of connecting to a server and playing back content.

Upon, for example, user request via a playback device, at least a portion of one or more of the alternative streams may be transmitted from a CDN to the playback device. The playback device may decode and present content for viewing. In a number of embodiments, a playback device streams content via a network 140. In many embodiments, a playback device requests segments of content from a first CDN server 110 as defined in a manifest or other URL. In some embodiments, the manifest may be generated to reference the entire content stream or a predetermined portion thereof. Alternatively, the manifest could be dynamically generated based upon the bookmark to include only media for playback beginning at the new playback location. As can readily be appreciated, certain devices may implement a playback client application to stream content.

In many embodiments of the invention, the playback client application may be configured to effect the reporting of heartbeat messages, or heartbeats, from the user device during streaming to, for example, a live bookmarking device 200. A heartbeat message may include periodic messages containing data indicating a last playback time to indicate the continued playback of the streamed content. Upon interruption of playback, the heartbeats may cease to be reported from the playback device. In many embodiments, the heartbeat messages include data indicating a playback time. In several embodiments, the heartbeat messages include data indicating a reference to a particular file (e.g. a URL).

In many embodiments of the invention, a live bookmarking device 200 may be connected to the system 100 via the network 140. It may receive heartbeat messages, store data contained within the heartbeat messages in database 205, and use the data from the heartbeat messages to determine bookmarks or playback locations in files containing the real-time and/or archived media content. Live bookmarking device 200 may send the bookmark information to a user device, an authorization server, a content provider, and/or one or more other components via network 140. The bookmark information may be used, for example, to continue playback of files containing media content starting from a user's previous playback location, or a point at which the user previously interrupted playback of the media content.

While a variety of live streaming systems are described above with reference to FIG. 1, various specific components may be utilized within a live streaming system depending upon the requirements of specific applications. Live bookmarking devices in accordance with various embodiments of the invention are discussed further below.

Live Bookmarking Devices

Figure 2:
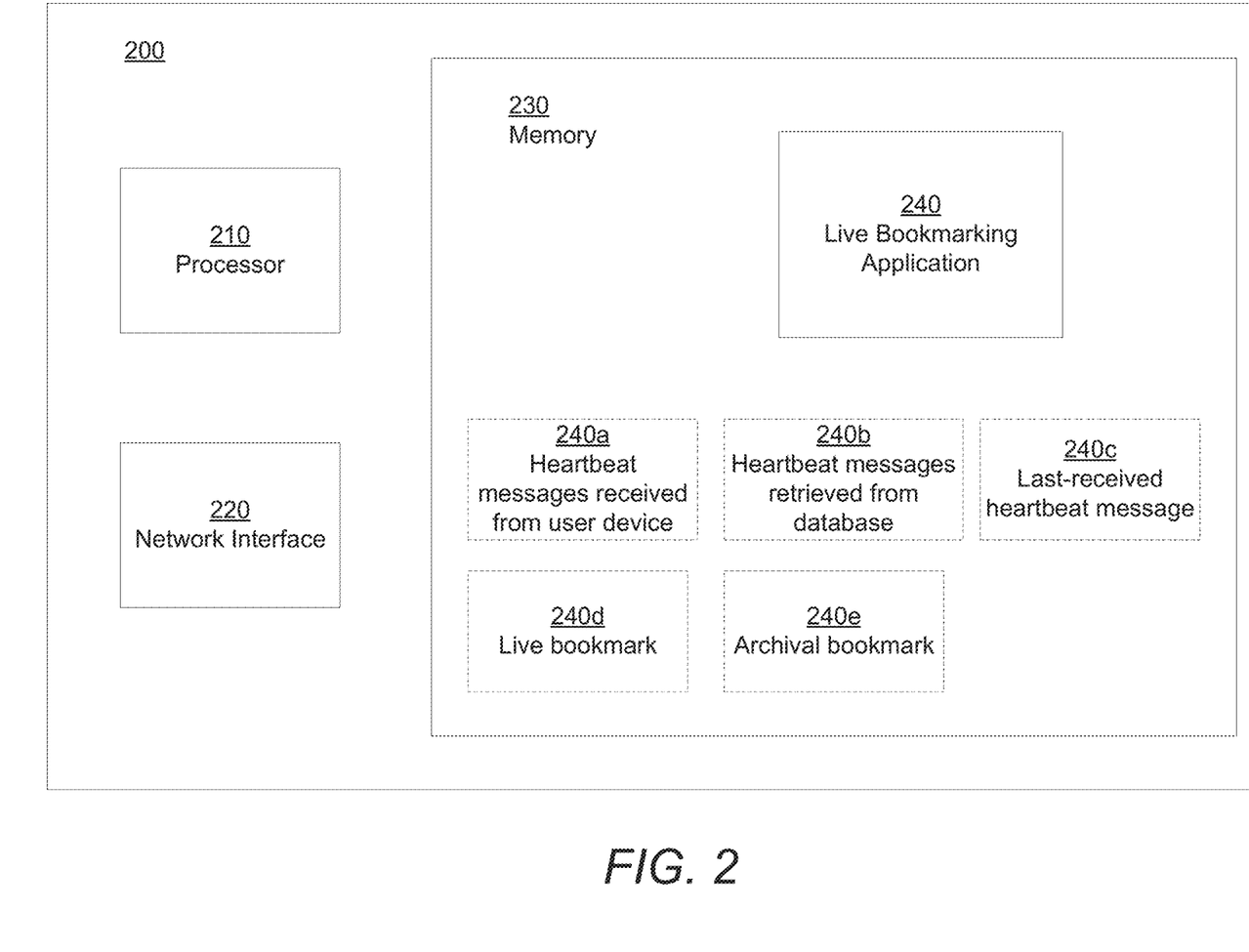
FIG. 2 is a diagram illustrating a live bookmarking device in accordance with an embodiment of the invention.

A live bookmarking device 200 that can be utilized to perform bookmarking of live media content in accordance with an embodiment of the invention is illustrated in FIG. 2. Live bookmarking device 200 may include a processor or processing system 210, network interface 220, and memory 230. The live bookmarking device 200 may function as a heartbeat server to receive heartbeat messages 240a from playback devices via network interface 220. Alternatively, the live bookmarking device 200 may be in communication with a separate heartbeat server that receives the heartbeat messages. Once received, data from the heartbeat messages may be stored in a heartbeat database 205 of FIG. 1 for future use.

Processor 210 may refer to one or more devices that can be configured to perform computations via machine readable instructions stored within memory 230. The memory 230 may contain a live bookmarking application 240 that directs the processor 210 to perform one or more of a variety of processes in accordance with an embodiment of the invention. The memory 230 may also store various types of data, simultaneously or in succession, such as but not limited to data 240a-e as shown in FIG. 2. For example, live bookmarking application 240 may direct the processor 210 to retrieve from the heartbeat database 205 heartbeat messages 240b from one streaming session on a playback device, to determine information about that streaming session. The processor 210 may, for example, identify the last heartbeat message received 240c during a user's single streaming session on a given playback device, and use the information to provide a recommendation for a start time or location at which playback should resume in a subsequent streaming session by the user on the same or different playback device. In some embodiments of the invention, the point or portion at which to begin continued playback may be in the form of a bookmark 240d in relation to the live stream, or a bookmark 240e in relation to the files containing the archived media content.

One or more bookmarks may be reported from the live bookmarking device 200 via network interface 220 to one or more other devices. As an example and not by way of limitation, a bookmark may be sent to a user device requesting the media content for playback at a later time, or an appropriate authorization server, and the user device may resume playback beginning at the point in or portion of the media content indicated by the bookmark. A live bookmark, archival bookmark, or both, may be sent depending on whether the live or archived version of the media content will be played at the time. Alternatively or additionally, one or more bookmarks may be sent from the live bookmarking device 200 to a content provider for analytics purposes. As can readily be appreciated, the use of heartbeat data collected via a heartbeat server is logically only limited by the requirements of a given application. In many embodiments, the process of archiving the live content results in a live bookmarking sending updated bookmarking data that references the archived media content and a playback location within the archived media content. The live bookmarking application 240 can direct the processor 210 to store and/or replace the live bookmark data with the bookmark data related to the archived media.

Live bookmarking device 200 may be implemented on a single computing device in accordance with some embodiments of the invention, such as that illustrated in FIG. 2. Live bookmarking device 200 may be a personal computer, a laptop computer, a mobile phone, a mobile computing device, a tablet computer, a cloud processing resource, an embedded computing platform and/or any other computing device with sufficient processing power for the processes described herein. Live bookmarking device 200 may perform processing locally, or it may partially compute information locally, with additional processing being performed on one or more independent or remote devices. According to other embodiments of the invention, the live bookmarking device 200 may be a system implemented on multiple computers. As can be readily appreciated, a variety of software architectures can be utilized to implement a live bookmarking device 200 in accordance with several embodiments of the invention.

While a variety of live bookmarking devices are described above with reference to FIGS. 1-2, other devices incorporating any of a variety of hardware enabling the bookmarking of live and archived media content can be utilized as appropriate to the requirements of specific applications in accordance with various embodiments of the invention. Playback devices in accordance with a number of embodiments of the invention are discussed below.

Playback Devices

In many embodiments of the invention, a playback device is used to request content from, for example, CDN servers for streaming. In many instances, the playback device may obtain authorization for playback of certain content from an authorization server. During playback of the content, the playback device may transmit heartbeat messages through a network to indicate ongoing playback status, and cease heartbeat transmission upon interruption of playback.

Figure 3:
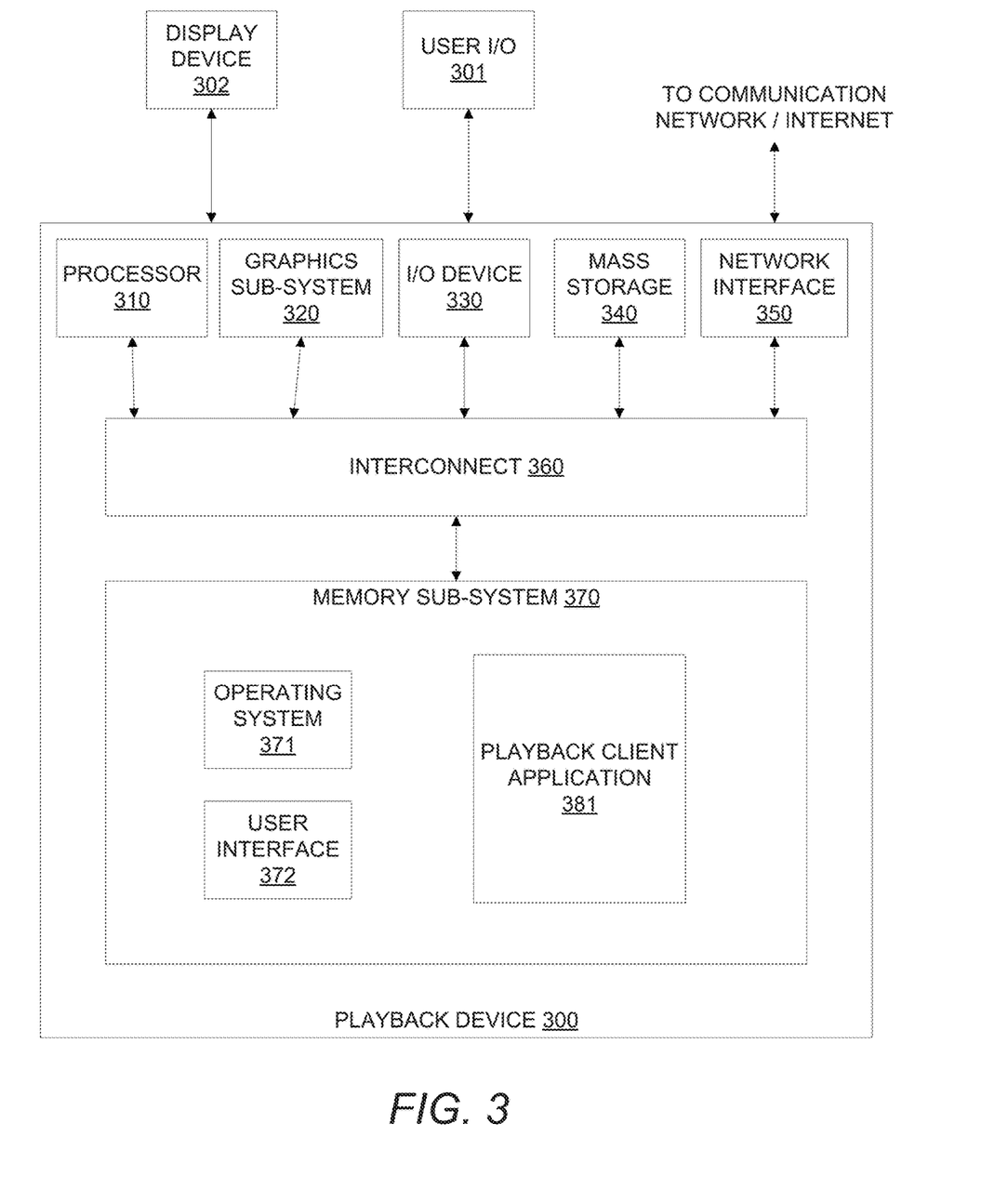
FIG. 3 is a diagram illustrating a playback device in accordance with an embodiment of the invention.

A playback device 300 that can be utilized in a live streaming system in accordance with an embodiment of the invention is illustrated in FIG. 3. Playback device 300 may include a processor 310, graphics sub-system 320, I/O device 330, mass storage 340, network interface 350, interconnect 360, and memory sub-system or processor memory 370. The memory sub-system 370 may contain an operating system 371, user interface 372, and playback client application 381. Certain embodiments of the invention may have a playback device 300 that receives content via an interface with a communication network including, (but not limited to), the Internet. Additionally, further embodiments of the invention can include a display device 302 connected to the playback device 300. In certain embodiments, the display device 302 can be integrated within the playback device 300. Still further embodiments of the invention can include user I/O 301 interfacing with a playback device 300.

Playback client application 381 may direct processor 310 to transmit heartbeat messages to a heartbeat server upon commencement of content playback. The heartbeat messages may be transmitted periodically at regular intervals, and may continue as long as the content is successfully streaming on the playback device 300. When playback is interrupted as a result of completed playback of the streamed media content, a user input for pausing or stopping, network failure, or one or more of a variety of other reasons, the playback device 300 may also stop transmitting heartbeat messages.

Further, the playback client application 381 may be configured to commence playback of files containing media content based on a bookmark received at the playback device 300. The received bookmark may be a live bookmark correlated with files containing real-time media content, an archival bookmark correlated with files containing archived media content, or both. The playback device 300 may receive the bookmark information from a live bookmarking device, an authorization server, or other device, and may commence playback at a time or location within files containing media content based on the bookmark information.

While a variety of playback device systems are described above with reference to FIG. 3, other playback devices incorporating any of a variety of hardware enabling playback of content can be utilized as appropriate to the requirements of specific applications in accordance with various embodiments of the invention. Live bookmarking processes in accordance with a number of embodiments of the invention are discussed below.

Live Bookmarking Processes

Figure 4:
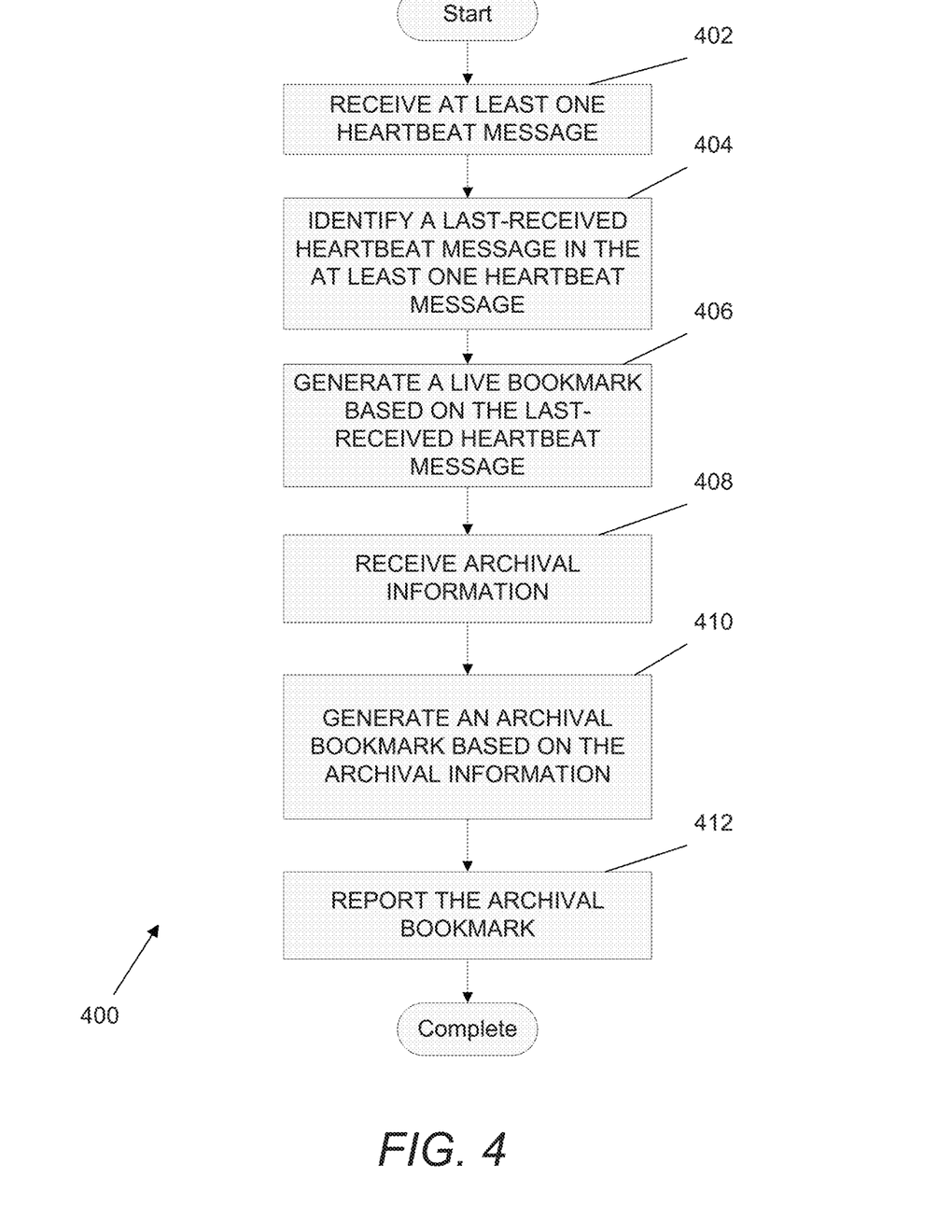
FIG. 4 is a flowchart illustrating a live bookmarking process in accordance with an embodiment of the invention.

Processes for live bookmarking in accordance with various embodiments of the invention are illustrated in FIG. 4. The process 400 includes receiving (402) at least one heartbeat message. Heartbeat messages may be received through a network from a user playback device, indicating ongoing playback status of certain content, such as a live-streamed media, on that device. As noted above, content typically includes multiple streams of video encoded at different resolutions, aspect ratios, and/or bit rates, multiple streams of audio containing encoded audio in different languages, and/or multiple streams of subtitle text containing text in different languages. All or some of the data contained within the heartbeat messages may be stored in a database for future reference. Data stored from one or more of the heartbeat messages may later be retrieved and/or received from the database for various purposes. Alternatively, data from at least one heartbeat message may be received initially from a heartbeat storage device.

In many embodiments of the invention, a last-received heartbeat message is identified (404) in one or more heartbeat messages from a live-streamed playback session. The last-received heartbeat message may be the last heartbeat message received from the user device for a particular playback session, indicating a time at, immediately before, or immediately after the interruption of playback. Based on identification of this last-received heartbeat message, a live bookmark may be determined (406) in accordance with several embodiments of the invention. The live bookmark may contain data referencing a live playback location, or a point or portion at which playback was interrupted during a real-time streaming session. The marked point or portion may include a last playback location or time, or other indication of location within the stream. The stream may include a live event, commercials, and/or other non-event programming.

After conclusion of the media event and/or live stream, the stream may be archived into files containing the media content by the content provider, encoding server, CDN, and/or other archiving entity. The archived files containing the media content may include the same programming as the live stream, or it may be altered to remove or replace commercials, insert or remove non-event programming, or otherwise edit certain portions of the media content forming the separate media streams. Thus, it is likely that the archived media files may be of a different duration than the live stream. In addition, the playback location within the live stream indicated by the data within a live bookmark may no longer correlate properly to the same point or portion in the content as archived. That is, where the playback location or time designated a certain moment or occurrence in the content as live streamed, that same playback location or time may not designate the same moment or occurrence in the content as archived. If, for example, a user again requested playback of the media content after it had been archived, and the archived version were to be selected for this later playback session, resuming playback of the archived version from the live playback location indicated by the live bookmark would not necessarily allow the user to view the content from his previous playback location or portion.

The archiving entity or another entity may, however, generate and/or maintain information about the files containing the archived media content, together with or separately from the files. This archival information may include data such as but not limited to whether the media content has been archived, whether the archived version is ready for distribution, duration of the archived files, portions of the live stream that have been edited in the archived version, whether the edits include removal, additional, and/or replacement of material, the time differences resulting from the edits, section or chapter markers indicating various portions of the content in the live and archived versions, and/or other information regarding differences between the archived and live versions of the media content.

Time differences between portions of content corresponding between the live stream and the archived version, resulting from edits to the archived version, can increase throughout the archived media content. Processes may be used in many embodiments of the invention to keep a running total of these differences based upon the amount of content removed from the live stream to create the archival stream.

In a number of embodiments of the invention, some or all of the archival information for certain files containing the media content may be retrieved and/or received (408), and used to translate (410) the live bookmark into an archival bookmark that contains data referencing an archival playback location that appropriately marks the user's playback location in the archived version of the content. This translation may be performed at various times, such as but not limited to after an indication that the media content has been archived, after the user requests continued playback at a later time, and/or other selected times. As can be readily appreciated, one or more of a variety of methods can be used to calculate an content time marker in the files containing the archived media content that corresponds to an content time marker in the live stream.

As an example and not by way of limitation, during the viewing of a 2-hour live stream of an event, a user may interrupt playback at the 60-minute mark. Later, after the media content has been archived, the user requests continued playback of the content. The live bookmark at the 60-minute mark is no longer applicable based on archival information indicating that there were 15 cumulative minutes of commercials in the first hour of the live-streamed content, and those commercials have been removed in the archived files. Thus, translation of the live bookmark into an archival bookmark is performed, and the latter designates a 45-minute time marker from which to resume playback using the archived version of the content.

The combined 15 minutes of commercials could be comprised of several commercial breaks of different durations, such as one 4-minute commercial, one 3-minute commercial, four 2-minute commercials, each of which began and ended within the first 60 minutes of the live stream viewed by the user. Alternatively, one of the commercials could be a 3-minute commercial being transmitted from time 00:58 (hrs:min) to 00:61. Since the user interrupted playback at time 00:60, only 2 minutes out of this 3-minute commercial would need to be accounted for when converting the live bookmark time value to the archival bookmark time value. Thus, depending on the location of the user interruption, the durations of all break periods or portions thereof preceding the playback location as indicated by the live bookmark may be summed and then subtracted from time of the live bookmark location, to compute the resulting archival bookmark location.

As a further example and not by way of limitation, content could also be added to the archived version of the content. Accordingly, in certain embodiments of the invention, time could be added when converting the live bookmark time value to the archival bookmark time value, in a similar fashion as described above with regard to subtracting time when portions of content are removed. This addition of time may be performed instead of or in addition to the subtraction of time, depending on whether content is removed as well as added. The added content can include one or more types of content, and is not limited to event programming, station programming, commercials, or various other types of content. As can readily be appreciated, many variations of differences between live and archived versions of media content may arise, and thus the translation between the corresponding bookmarks may be achieved in numerous ways. The archival bookmark may be reported (412) to the user device, which may allow for continued playback of the content using the files containing the archived media content. Alternatively, the archival bookmark may be reported to an authorization server to, for example, authorize playback only from the point or portion in the content at which the user previously stopped viewing. In addition, the content provider may receive the archival bookmark for various uses, such as analyzing occurrences in a set of media content where an audience tends to pause or cease viewing.

While live bookmarking processes are described above with respect to FIG. 4, other processes may be utilized as appropriate to the requirements of a specific application in accordance with various embodiments of the invention.

Conclusion

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for bookmarking live media content, comprising:
   a live bookmarking server system; and
   a playback user device;
   wherein the live bookmarking server system comprises:
   at least one processing system; and
   memory connected to the at least one processing system, the memory containing at least one live bookmarking application, wherein the at least one live bookmarking application directs the at least one processing system to:

receive from a bookmarking user device at least one heartbeat message containing data indicating a playback location with respect to a plurality of media streams generated in real time with the capture of the content contained within the media streams;

identify a last-received heartbeat message in the at least one heartbeat message;

generate a live bookmark containing data referencing a live playback location with respect to the plurality of media streams based on the last-received heartbeat message;

receive archival information describing a plurality of files containing archived versions of the plurality of media streams, where the archived versions of the plurality of media streams are modified to remove a first portion of the content contained within the plurality of media streams generated in real time;

generate an archival bookmark containing data referencing an archival playback location with respect to the archived versions of the plurality of media streams based on the live bookmark; and report the archival bookmark to the playback user device;

wherein the playback user device comprises:

a processor; and processor memory connected to the processor, the processor memory containing a playback client application, wherein the playback client application directs the processor to:

send a request for content;

receive a manifest and the archival bookmark;

request a second portion of the plurality of media files based upon the manifest and the archival bookmark;

receive the second portion of the plurality of media files; and play back the received second portion of the plurality of media files.

2. The system of claim 1, wherein the live bookmarking application further directs the at least one processing system to:

receive a plurality of heartbeat messages from the bookmarking user device, the plurality of heartbeat messages including the at least one heartbeat message; and store data from the plurality of heartbeat messages in a database.

3. The method of claim 2, wherein the live bookmark indicates a time in the plurality of media streams corresponding to a portion of the content, and the archival bookmark indicates a time in the archived versions of the plurality of media streams corresponding to the portion of the content.

4. The system of claim 1, wherein the bookmarking user device and the playback user device are the same device.

5. The system of claim 1, wherein the live bookmark indicates a time at which playback of the content contained within the plurality of media streams was interrupted.

6. The system of claim 1, wherein the archived versions of the plurality of media streams have different durations than the plurality of media streams generated in real time.

7. The system of claim 1, wherein the removed first portion includes a commercial.

8. The system of claim 1, wherein the archival information indicates differences between the plurality of media streams generated in real time and the archived versions of the plurality of media streams.

9. The system of claim 1, wherein the live bookmarking application further directs the at least one processing system to generate the archival bookmark based on a time difference.

10. The system of claim 1, wherein the live bookmark indicates a time in the plurality of media streams corresponding to a portion of the content, and the archival bookmark indicates a time in the archived versions of the plurality of media streams corresponding to the portion of the content.

11. The system of claim 1, wherein the live bookmarking application further directs the at least one processing system to report the archival bookmark to a device selected from the group consisting of a playback device and an authorization server.

12. The system of claim 1, wherein the manifest is dynamically generated based upon the archival bookmark.

13. A method for bookmarking live media content, comprising:

receiving at a server from a bookmarking user device at least one heartbeat message containing data indicating a playback location with respect to a plurality of media streams generated in real time with the capture of the content contained within the media streams;

identifying by the server a last-received heartbeat message in the at least one heartbeat message;

generating by the server a live bookmark containing data referencing a live playback location with respect to the plurality of media streams based on the last-received heartbeat message;

receiving at the server archival information describing a plurality of files containing archived versions of the plurality of media streams, where the archived versions of the plurality of media streams are modified to remove a first portion of the content contained within the plurality of media streams generated in real time;

generating at the server an archival bookmark containing data referencing an archival playback location with respect to the archived versions of the plurality of media streams based on the live bookmark;

reporting the archival bookmark from the server to a playback user device;

sending from the playback user device a request for content;

receiving at the playback user device a manifest and the archival bookmark;

requesting by the playback user device a second portion of the plurality of media files based upon the manifest and the archival bookmark;

receiving at the playback user device the second portion of the plurality of media files; and playing back the received second portion of the plurality of media files using the playback user device.

14. The method of claim 13, further comprising:

receiving at the server a plurality of heartbeats from the bookmarking user device, the plurality of heartbeat messages including the at least one heartbeat message; and storing data from the plurality of heartbeat messages in a database, using the server.

15. The method of claim 13, wherein the bookmarking user device and the playback user device are the same device.

16. The method of claim 13, wherein the live bookmark indicates a time at which playback of the content contained within the plurality of media streams was interrupted.

17. The method of claim 13, wherein the archived versions of the plurality of media streams have different durations than the plurality of media streams generated in real time.

18. The method of claim 13, wherein the removed first portion includes a commercial.

19. The method of claim 13, wherein the archival information indicates differences between the plurality of media streams generated in real time and the archived versions of the plurality of media streams.

20. The method of claim 13, wherein generating the archival bookmark is performed based on a time difference.

21. The method of claim 13, wherein reporting the archival bookmark further comprises reporting the archival bookmark to a device selected from the group consisting of a playback device and an authorization server.

22. The method of claim 13, wherein the manifest is dynamically generated based upon the archival bookmark.

\* \* \* \* \*